United States Patent

Balme et al.

[11] 4,038,450
[45] July 26, 1977

[54] THIXOTROPIC AQUEOUS POLYIMIDE COMPOSITIONS

[75] Inventors: Maurice Balme, Sainte-Foy-les-Lyon; Jean Gattus, La Mulatiere; Bernard Gérard, Lyon, all of France

[73] Assignee: Rhone-Poulenc S.A., Paris, France

[21] Appl. No.: 429,881

[22] Filed: Jan. 2, 1974

Related U.S. Application Data

[63] Continuation of Ser. No. 190,815, Oct. 20, 1971, abandoned.

[30] Foreign Application Priority Data

Oct. 23, 1970 France .................. 70.38362
June 24, 1971 France .................. 71.23066

[51] Int. Cl.² ............... C08G 69/00; B32B 17/02
[52] U.S. Cl. ............... 428/268; 260/29.2 UA; 260/29.2 N; 260/78 UA; 428/474
[58] Field of Search ............ 260/29.2 N, 29.2 UA; 428/268, 474

[56] References Cited

U.S. PATENT DOCUMENTS

| | | | |
|---|---|---|---|
| 3,562,223 | 2/1971 | Bargain et al. | 260/78 UA |
| 3,625,912 | 12/1971 | Vincent et al. | 260/78 UA |
| 3,637,901 | 1/1972 | Bargain et al. | 260/78 UA |
| 3,652,511 | 3/1972 | Vincent et al. | 260/78 UA |
| 3,658,764 | 4/1972 | Bargain et al. | 260/78 UA |
| 3,669,930 | 6/1972 | Asahara et al. | 260/78 UA |
| 3,679,639 | 7/1972 | Bargain et al. | 260/78 UA |
| 3,772,228 | 11/1973 | Allen | 260/29.2 EP |

Primary Examiner—Murray Tillman
Assistant Examiner—A. H. Koeckert
Attorney, Agent, or Firm—Stevens, Davis, Miller & Mosher

[57] ABSTRACT

Compositions are provided which consist of a solid suspension of:

a. a prepolymer obtained by reacting a N,N'-bisimide of an unsaturated dicarboxylic acid of general formula

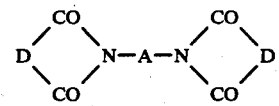

in which D represents a divalent organic radical containing a carbon-carbon double bond and A represents a divalent organic radical possessing from 2 to 30 carbon atoms, and a polyamine of general formula:

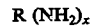

in which $x$ represents an integer at least equal to 2 and R represents an organic radial of valency $x$, the bis-imide being used in an amount from 0.55 to 25 mols per mol of $-NH_2$ group introduced by the polyamine, suspended in:

b. water, and optionally, c. a polar water-miscible organic solvent having a boiling point between 110° C and 270° C in an amount up to 50% by weight of the liquid phase. These compositions are thixotropic and useful for coating and impregnating fibrous materials and the like from which valuable resinous composites can be obtained.

16 Claims, No Drawings

THIXOTROPIC AQUEOUS POLYIMIDE COMPOSITIONS

This is a continuation of application Ser. No. 190,815, filed Oct. 20, 1971, now abandoned.

The present invention relates to compositions consisting of thixotropic aqueous suspensions of prepolymers possessing imide groups.

Our French Pat. No. 1,555,564 describes thermosetting resins obtained by reacting a N,N'-bis-imide of an unsaturated dicarboxylic acid with a di-primary diamine containing up to 30 carbon atoms. The amounts of N,N'-bis-imide and of diamine are so chosen that the ratio $$\frac{\text{No. of mols of bis-imide}}{\text{No. of mols of diamine}}$$

is at least equal to 1; furthermore, it is generally preferred that it should be less than 50. Thermosetting resins which are remarkably resistant to severe heat exposures can thereby be obtained. French Pat. No. 1,555,564 also indicates that the preparation of these resins can be carried out in bulk, by heating the previously intimately mixed reagents, or in an inert polar diluent such as dimethylformamide, N-methyl-pyrrolidone or dimethylacetamide, this latter process being used, for example if the use of the polymer formed requires the use of a solution. Finally it is stated that for numerous uses it is advantageous to carry out the process in two stages; in the first stage a prepolymer is prepared by heating the intimate mixture of the two reagents to a temperature of the order of 100° to 250° C. The prepolymer obtained can be used in the form of a solution, a suspension or a powder or can also be shaped by simple casting whilst hot. In the second stage, the prepolymer is cured by heating to temperatures of the order of 350° C, if appropriate under pressure.

The present invention provides a composition which is a storage-stable thixotropic solid suspension of:

a. a prepolymer obtained by reaction of a N,N'-bis-imide of an unsaturated dicarboxylic acid of general formula

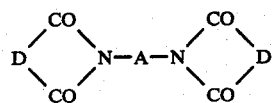

(I)

in which D represents a divalent organic radical containing a carbon-carbon double bond and A represents a divalent organic radical possessing 2 to 30 carbon atoms, and a polyamine of general formula:

$$R(NH_2)_x \qquad (II)$$

in which $x$ is an integer at least equal to 2 and R represents an organic radical of valency $x$, the bis-imide being used in an amount from 0.55 to 25 mols per mol of $-NH_2$ group introduced by the polyamine, suspended in:

b. Water, and, c. if appropriate, a polar water-miscible organic solvent having a boiling point of between 110° C and 270° C in an amount up to 50% by weight of the liquid phase.

In formula (I), the symbol D is derived from an anhydride of an ethylenic dicarboxylic acid of general formula:

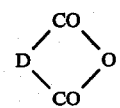

(III)

such as maleic anhydride, citraconic anhydride, itaconic anhydride, pyrocinchonic anhydride, dichloromaleic anhydride or the Diels-Alder reaction products of one of these anhydrides with an acyclic, alicyclic or heterocyclic diene. As regards the anhydrides resulting from a diene synthesis, reference may be made to Volume IV of "Organic Reactions" (John Wiley and Sons, Inc.); in particular, tetrahydrophthalic anhydride and endomethylenetetrahydrophthalic anhydride may be mentioned.

The symbol A can, for example, represent a linear or branched alkylene radical having less than 13 carbon atoms, a phenylene or cyclohexylene radical, or a radical of formula:

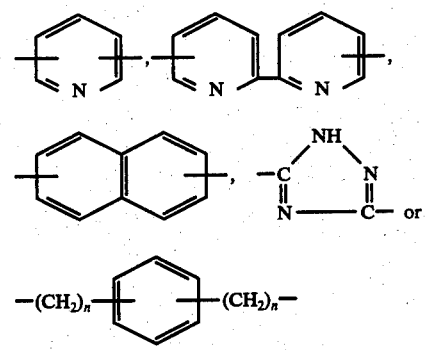

wherein $n$ represents an integer from 1 to 3. The symbol A can also represent several phenylene or cyclohexylene radicals linked to one another by a simple valency bond or by an inert atom or group such as —O—, —S—, an alkylene group having 1 to 3 carbon atoms, —CO—, —SO$_2$—, —NR$_1$—, —N=N—, —CONH—, —COO—, —P(O)R$_1$—, —CONH—X—NHCO—,

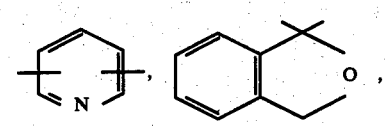

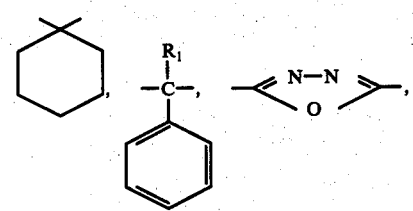

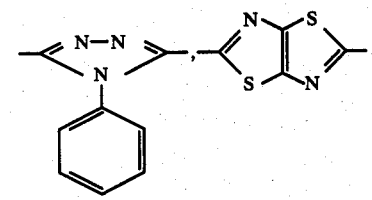

-continued

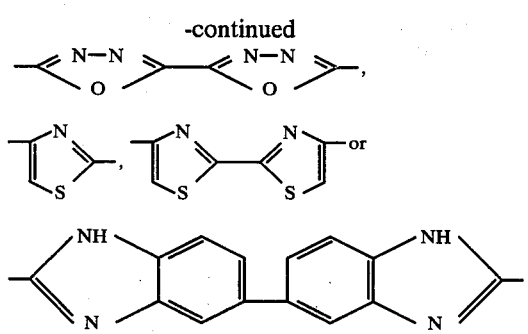

wherein $R_1$ represents a hydrogen atom, an alkyl radical having from 1 to 4 carbon atoms, a phenyl radical or a cyclohexyl radical and X represents an alkylene radical having less than 13 carbon atoms. The various phenylene or cyclohexylene radicals can be substituted by methyl groups, for example.

Specific examples of bis-imides (I) which may be used include: N,N'-ethylene-bis-maleimide, N,N'-hexamethylene-bis-maleimide, N,N'-meta-phenylene-bis-maleimide, N,N'-para-phenylene-bis-maleimide, N,N'-4,4'-diphenylmethane-bis-maleimide, N,N'-4,4'-diphenyl-ether-bis-maleimide, N,N'-4,4'-diphenylsulphone-bis-maleimide, N,N'-4,4'-dicyclohexyl-methane-bis-maleimide, N,N'-4,4'-diphenyl-3,5-pyridine-bis-maleimide, N,N'-2,6-pyridinediyl-bis-maleimide, N,N'-α,α'-4,4'-dimethylene-cyclohexane-bis-maleimide, N,N'-meta-xylylene-bis-maleimide, N,N'-para-xylylene-bis-maleimide, N,N'-4,4'-diphenylcyclohexane-bis-maleimide, N,N'-meta-phenylene-bis-tetrahydrophthalimide, N,N'-4,4'-diphenylmethane-bis-citraconimide, N,N'-4,4'-diphenyl-1,1-propane-bis-maleimide, N,N'-4,4'-triphenyl-1,1,1-ethane-bis-maleimide, N,N'-4,4'-tri-phenylmethane-bis-maleinide and N,N'-3,5-triazole-1,2,4-bis-maleimide.

These bis-imides can be prepared by, for example, the methods described in U.S. Pat. No. 3,018,290 and British patent specification No. 1,137,592.

The polyamine (II) can be a di-primary diamine of general formula $$H_2N — E — NH_2 \qquad (IV)$$

in which the symbol E represents one of the radicals which the radical A may represent. Examples of di-primary diamines which can be used for the preparation of the prepolymer (a), include 4,4'-diamino-dicyclohexylmethane, 1,4-diamine-cyclohexane, 2,6-diamino-pyridine, metaphenylenediamine, para-phenylenediamine, 4,4'-diaminodiphenylmethane, 2,2-bis(4-aminophenyl)-propane, benzidine, 4,4'-diaminophenylether, 4,4'-diaminophenylsulphide, 4,4'-diaminophenylenesulphone,bis(4-aminophenyl)methylphosphine oxide, bis(4-aminophenyl)phenylphosphine oxide, N,N-bis(4-aminophenyl)methylamine, 1,5-diaminonaphthalene, meta-xylylenediamine, para-xylylenediamine, 1,1-bis(-para-aminophenyl)phthalene, hexamethylenediamine, 6,6'-diamino-2,2'-dipyridyl, 4,4'-diaminobenzophenone, 4,4'-diaminoazobenzene, bis(4-aminophenyl)phenylmethane, 1,1-bis(4-aminophenyl)cyclohexane, 1,1-bis(4-amino-3-methylphenyl)cyclohexane, 2,5-bis(m-aminophenyl)-1,3,4-oxadiazole, 2,5-bis(p-aminophenyl)-1,3,4-oxadiazole, 2,5-bis(m-aminophenyl)thiazolo(4,5-d)thiazole, 5,5'-di(m-aminophenyl)-2,2'-bis(1,3,4-oxadiazolyl),4,4'-bis(p-aminophenyl)-2,2'-dithiazole, m-bis[2-(4-p-aminophenyl)thiazolyl]benzene, 2,2'-bis(m-aminophenyl)-5,5'-dibenzimidazole, 4,4'-diaminobenzanilide, phenyl-4,4'-diaminobenzoate, N,N'-bis(4-aminobenzoyl)-p-phenylenediamine, 3,5-bis(m-aminophenyl)-4-phenyl-1,2,4-triazole, 4,4'-N,N'-bis(p-aminobenzoyl)diaminodiphenylmethane, bis-p-(4-aminophenoxycarbonyl)benzene, bis-p-(4-aminophenoxy)benzene, 3,5-diamino-1,2,4-triazole, 1,1-bis(4-aminophenyl)-1-phenylethane and 3,5-bis(4-aminophenyl)pyridine.

Polyamines (II) other than the di-primary diamines which may be used include those which have fewer than 50 carbon atoms and which possess from 3 to 5 —$NH_2$ groups per molecule. The —$NH_2$ groups can be carried by a benzene nucleus, optionally substituted by methyl groups, or by a naphthalene, pyridine or triazine nucleus; they can also be carried by several benzene nuclei linked to one another by a simple valency bond or by an inert atom or group which can be one of those described above for the symbol A or can be

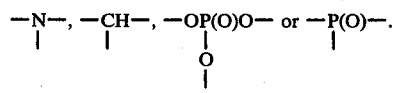

As examples of such polyamines there may be mentioned 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 2,4,6-triaminopyridine, 2,4,4'-triaminophenyl ether, 2,4,4'-triaminophenylmethane, 2,4,4'-triaminodiphenylsulphone, 2,4,4'-triaminobenzophenone, 2,4,4'-triamino-3-methyl-diphenylmethane, N,N,N-tri(4-aminophenyl)amine, tri(4-aminophenyl)methane, 4,4',4"-triaminophenyl orthophosphate, tri(4-aminophenyl)phosphine oxide, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminophenyl ether, 3,3',4,4'-tetraaminodiphenylmethane, 3,3',4,4'-tetraaminodiphenylsulphone, 3,5-bis(3,4'-diaminophenyl)pyridine and the oligomers of average formula:

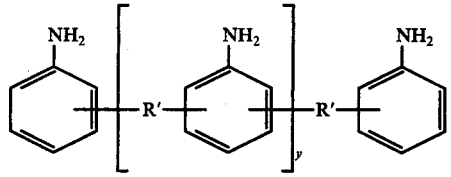

in which y represents a number ranging from about 0.1 to 2 and R' represents a divalent hydrocarbon radical having from 1 to 8 carbon atoms and derived from an aldehyde or ketone of general formula:

$$O = R' \qquad (VI)$$

in which the oxygen atom is bonded to a carbon atom of the radical R'; typical aldehydes and ketones are formaldehyde, acetaldehyde, benzaldehyde, oenanthaldehyde, acetone, methyl ethyl ketone, 2-hexanone, cyclohexanone and acetophenone. These oligomers can be obtained in accordance with known processes, such a those described in French Pat. Nos. 1,430,977, 1,481,935 and 1,533,696; the crude mixtures of oligomers obtained by those processes can be enriched in one or more of their constituents, for example by distillation under reduced pressure.

The prepolymer (a) can be prepared by heating the optionally previously intimately mixed bis-imide and polyamine to between 50° C and 250° C. Prepolymers (a) having a softening point between 50° C and 200° C are preferred; they can be obtained by heating the bis-imide and the polyamine in bulk until a homogeneous liquid or pasty mixture is obtained. The temperature used depends on the melting point of the initial reagents but is, as a general rule, between 80° C and 180° C. It is advantageous to homogenise the mixture of the reagents beforehand. The prepolymers can also be prepared by heating the reagents in a polar solvent such as dimethylformamide, N-methylpyrrolidone, dimethylacetamide, N-methylcaprolactam, diethylformamide and N-acetylpyrrolidone, suitably to a temperature of between 50° C and 180° C; the prepolymer can be isolated from its solution by precipitation with a diluent which is miscible with the polar solvent and does not dissolve the prepolymer; water or a hydrocarbon of boiling point not significantly exceeding 120° C can advantageously be used as the diluent.

The prepolymers can be prepared in the presence of a catalyst consisting of a strong acid. By "strong acid" as used herein is meant, in the Bronsted sense, monoacids or polyacids of which at least one of the acid groups has an ionisation constant (pKa) of less than 4.5. Typical such acids include inorganic acids such as hydrochloric, sulphuric, nitric and phophoric acids, substituted by an organic radical where appropriate, as in for example the sulphonic and phosphonic acids. The acids can also be carboxylic acids; these can be of a simple structure or possess groups which do not interfere with the reaction between the bis-imide (I) and the polyamine (II). The preferred acid is maleic acid. Generally, the acids are used in an amount from 0.5 to 5% by weight based on the weight of the bis-imide (I) employed.

Amongst the organic solvents (c) which can be present in the compositions of this invention, those having a boiling point not significantly outside the range 120°–250° C and which are solvents for the prepolymer over at least a part of the temperature range of 25° to 150° C are preferred. Solvents which can be used include 2-methoxyethanol, 2-ethoxyethanol and their acetates, N-methylpyrrildone, dimethylformamide, dimethylacetamide, N-methylcaprolactam, N-acetylpyrrolidone and diethylformamide. It is particularly advantageous to use N-methylpyrrolidone.

In the compositions of this invention, the prepolymer can represent from 5 to 50%, preferably 15% to 45%, by weight of the weight of the composition. Where an organic solvent is present, it preferably represents from 5% to 35% of the weight of the liquid phase.

The preparation of the compositions can generally be carried out at ambient temperature (20° C to 30° C) and conists of dispersing the prepolymer in the liquid medium. The prepolymer should be used in divided form, the dimensions of the particles being preferably less than 100μ. The prepolymer can be dispersed in the liquid phase by applying conventional stirring methods. If the suspensions contain an organic solvent the latter can be introduced at the start as a solution in water; it is also possible to prepare beforehand the suspension of prepolymer in water and then to add the organic solvent at the end of the process or at the time of use of the composition.

The compositions according to the invention can be used directly after their preparation, but as they are remarkably stable on storage they can conveniently be kept for subsequent use. They are preferably kept in closed vessels at temperatures below 30° C and above their freezing point.

These compositions can be used for the preparation of composite materials; they are of very particular value for the production of coatings and pre-impregnated intermediate articles wherein the support is a fibrous material. These fibrous materials can be based on a silicate or oxide of aluminum or zirconium, carbon, graphite, boron, asbestos or glass. In the case of glass, it can be in the form of rovings, yarns, tows or fabrics, such as satin or taffetas produced from continuous fibres; it can also be in the form of yarns or woven or non-woven fabrics resulting from the combination of staple fibres; the fibrous material can be impregnated by applying the usual techniques, such as immersion or transfer impregnation; it is advantageous to premoisturise the fibres beforehand with water, optionally in combination with an organic solvent (c). With compositions which contain an organic solvent, the impregnation can be carried out rapidly without losing its efficiency.

The fibrous material coated with the composition should thereafter be dried, preferably in a ventilated atmosphere; the temperature and duration of the drying can vary depending, naturally, on whether the composition does or does not contain an organic solvent, and on the volatility of the solvent which may be used. As a general rule, the drying is carried out at between 100° C and 200° C for from 1 hour to several minutes.

The impregnated articles obtained from fibrous materials and the compositions of this invention can be used directly after drying or can be stored before subsequent use; they retain their properties remarkably well during storage at ambient temperature (20° C – 30° C) or below.

The prepolymer can thereafter be cured on its support by heating to temperatures of the order of 350° C, generally between 100° C and 280° C. The preimpregnated articles can be shaped beforehand or during curing, optionally in vacuo or under super-atmospheric pressure; these processes can also be carried out consecutively. Amongst their possible uses, their may be mentioned their use in filament windings and the production of laminates as sheets or complex shapes. The composite articles thus obtained are of very particular value in industries which require materials possessing good mechanical and electrical properties as well as great chemical inertness at temperatures of 220° C to 300° C. By way of example, they are very suitable for the manufacture of insulators in sheet or tube form, for dry transformers, transformer blocks and motor armatures, for printed circuits, honeycomb-structure panels and compressor vanes. Further details of the cured materials are to be found in our application Ser. No. 191,121, now U.S. Pat. No. 3,840,495 filed on even data herewith and entitled "Heat-stable polymers based on bis-imides and oligomeric amines".

The following Examples further illustrate the present invention.

EXAMPLE 1

Preparation of the prepolymer 820 g. of 4,4'-bis-maleimido-diphenylmethane were intimately mixed with 180 g. of 4,4'-diaminodiphenylmethane in a turbine mixer. The powder obtained was spread on a metal plate to a thickness of about 1 cm. The plate was thereafter placed in an oven at 165° C. for 30 minutes.

After cooling, a prepolymer was obtained which softened at 100° C. This prepolymer was ground, the diameter of the particles obtained being less than 40μ, 98% of them being of between 15 and 40μ.

Preparation of the composition 465 g. of water and 85 g. of N-methylpyrrolidone were introduced into a 2 l. vessel. 450 g. of the prepolymer were thereafter added over 15 minutes whilst stirring, and the mixture was then stirred for a further 30 minutes.

A thixotropic suspension was obtained, which had the appearance of an unctuous paste.

Impregnation of a glass fabric

A stip of satin type glass fabric of specific weight 308 g/m², was continuously impregnated with the composition prepared; this fabric was beforehand desized by heating and then treated with γ-aminopropyltriethoxysilane.

The strip of fabric first of all passed through a moisturising bath consisting of a mixture of water/N-methylpyrrolidone in the weight ratio of 85/15.

Thereafter the fabric was drained by passing it between two rollers and then vertically through an impregnation trough containing the composition described above to a depth of 30 cm. At the outlet, 2 doctor blades were arranged on either side of the strip, spaced 1.5 mm. apart. The impregnation trough and the doctor blades were equipped with rotating vibrators. The coated fabric finally passed through a vertical oven, 3 m. high, heated to 150° C., and ventilated with 2,000 m³ of air per hour. On issuing from the oven, the strip was wound up on a drum at the rate of 12 m/hour.

The fabric pre-impregnated in this way contained 30% by weight of prepolymer and 5.3% by weight of N-methylpyrrolidone, relative to the weight of prepolymer.

Preparation of a laminate 18 square samples (30 cm × 30 cm) were cut from the impregnated fabric and stacked alternatively in the weft and warp directions. The assembly was thereafter placed between the platens of a press which had been preheated to 100° C. and to which a pressure of 60 bars was applied. The temperature was then raised to 180° C., over 30 minutes; the whole was kept at this temperature for 1 hour. The laminate was cooled under pressure to 100° C. and then released and subjected to a supplementary heat treatment at 250° C. for 24 hours. At the end of this treatment, it had a flexural breaking strength of 60.5 kg/mm². After a heat exposure for 1,000 hours at 250° C., this flexural breaking strength was still 55 kg/mm². The laminate had the following properties:

|  | Before immersion | After immersion for 24 hours in water at 25° C. |
| --- | --- | --- |
| Resistivity in the transverse directon inΩ × cm | $3.10^{14}$ | $3.10^{13}$ |
| Dielectric strength in kV/mm | 25 | 22 |
| Dielectric constant | 4.3 | 4.5 |
| Tangent of loss angle | $8.10^{-3}$ | $1.0^{-2}$ |

EXAMPLE 2

This Example illustrates the stability on storage of a composition in which the liquid phase contains 15% by weight of N-methylpyrrolidone and 85% by weight of water.

A composition was prepared as in Example 1 and a glass fabric identical to that used in Example 1, previously subjected to moisturization, was coated with a part of this composition. The fabric was thereafter dried in a ventilated atmosphere for 15 minutes at 150° C. When impregnated in this way, it contained 35% by weight of prepolymer. 6 Circular samples (diameter : 75 mm.) were cut from this fabric and stacked between two samples of glass fabric coated with polytetrafluoroethylene.

The whole was heated between the platens of a press preheated to 120° C. A pressure of 15 bars was applied and the temperature was then raised to 200° C. over 30 minutes. After removal from the mould whilst hot, the following are weighed:

P = weight of the laminate with the resin exuded
$P_1$ = weight of the laminate without resin exuded
$P_2$ = weight of glass fabric employed.

The degree of exudation was calculated from the equation:

$$\frac{P - P_1}{P - P_2} \times 100$$

and found to be 28%.

Another part of the composition was stored for 2 months at ambient temperature (20°-25° C.). After stirring for some minutes, it reassumed its initial viscosity and its degree of exudation is determined in the manner indicated above. It was found to still equal 27-28%.

EXAMPLE 3

Preparation of the prepolymer

A 35 l. vessel equipped with a central stirrer and a jacket containing a heating fluid was used. A solution of 10,750 g. of N,N'-4,4'-diphenylmethane-bis-maleimide in 5,070 g. of dimethylformamide was introduced into this vessel and a solution obtained by dissolving 2,380 g. of 4,4'-diamino-diphenylmethane in 3,680 g. of dimethylformamide at 60° C. was added thereto. The whole was heated to 115° C. for 2½ hours whilst stirring and then cooled to 45° C.

The solution obtained was run, over 20 minutes, into 62 liters of water previously heated to 50° C., and stirred vigorously. The prepolymer which precipitated was filtered off and washed on the filter with 30 l. of water; it was thereafter dispersed in 62 l. of water and the suspension stirred for about 1 hour. After filtering, this operation was repeated twice more. The solid obtained after the last filtration contained 47% by weight of prepolymer and 53% by weight of water. The residual dimethylformamide amounted to less than 0.2% by weight relative to the prepolymer.

Preparation of the composition 648 g. of water were added to 852 g. of the solid obtained after the last filtration and the whole was stirred for 30 minutes. A homogeneous thixotropic suspension was thus obtained; a part of it was stored in closed vessels.

Preparation of a laminate

Glass fabric identical to that described in Example 1 was coated with a brush with a further part of the suspension, at 740 g/m². The fabric was thereafter dried at 132° C. for 30 minutes in a ventilated atmosphere, and 16 square samples (15 cm × 15 cm) were then cut out and stacked to give a laminated assembly.

The assembly was heated between the platens of a press preheated to 100° C. A pressure of 18 bars was applied and the temperature then raised to 250° C. over 50 minutes; the pressure was raised to 36 bars when the temperature reached 160° C. After cooling under pressure, the laminate was released; it contained 31% by weight of resin and had a flexural breaking strength at 25° C. of 58 kg/mm².

A laminate was prepared in the manner described above with a part of the composition which had been stored for 3 months. It had a flexural breaking strength of 61 kg/mm² at 25° C.

EXAMPLE 4

A prepolymer was prepared by heating a mixture of 45.2 g. of N,N'-diphenylmethane-bis-maleimide and 10.2 g. of a polyamine of average formula:

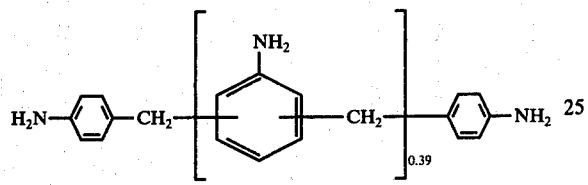

at 150° C. for 8 minutes. After cooling and grinding, the prepolymer had a softening point of about 106° C.

52.5 g. of prepolymer in a solution consisting of 84.7 g. of water and 15 g. of N-methylpyrrolidone were introduced with stirring, and the whole was then stirred for a further 30 minutes. 27 dm² of a satin type glass fibre fabric, of specific weight 308 g/m², were coated with 166 g. of the suspension thus obtained; this fabric had previously been desired by heating and then pretreated with gamma-aminopropyltriethoxy-silane. After coating, the fabric was dried for 20 minutes at 140° C. in a ventilated atmosphere.

After cooling, 12 square samples (15 × 15 cm) were cut from this fabric and stacked so as to form a laminated assembly. This assembly was thereafter heated between the platens of a press preheated to 100° C. The temperature was raised to 250° C. over one hour under a pressure of 30 bars. The whole was allowed to cool under pressure to 150° C. and the laminate then released; finally, the laminate was subjected to a supplementary heat treatment at 250° C. for 24 hours. It now had a flexural breaking strength at 25° C. of 56.5 kg/mm². At 250° C. this flexural breaking strength was 40.7 kg/mm².

After a heat exposure for 1,900 hours at 200° C., the flexural strength measured at 200° C. was still 47.8 kg/mm².

We claim:

1. A storage-stable composition which consists essentially of a thixotropic solid suspension of:
   a. a prepolymer having a particle size of less than 100 microns obtained by reacting, as the sole reactants, a N,N'-bis-imide of an unsaturated dicarboxylic acid of general formula:

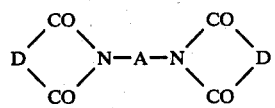

(I)

in which D represents a divalent organic radical containing a carbon-carbon double bond derived from an anhydride of an ethylenic dicarboxylic acid of general formula:

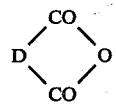

(III)

and A represents a linear or branched alkylene radical having less than 13 carbon atoms, a phenylene or cyclohexylene radical or a radical of formula:

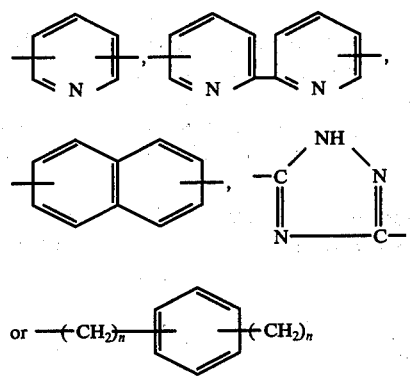

wherein $n$ represents an integer of from 1 to 3, or several phenylene or cyclohexylene radicals linked to one another by a valency bond or an inert atom or group, and a polyamine of general formula:

$R(NH_2)_x$ in which $x$ represents an integer at least equal to 2 and R represents an organic radical of valency $x$ selected from a divalent radical as defined under A, a polyvalent benzene, naphthalene, pyridine or triazine radical or several benzene nuclei linked to one another by a valency bond or an inert atom or group, the bis-imide being used in an amount from 0.55 to 25 mols per mol of $-NH_2$ group introduced by the polyamine, suspended in:
   b. water.

2. A composition according to claim 1 which also contains a polar water-miscible organic solvent having a boiling poing of between 110° C. and 270° C., in an amount up to 50% by weight of the water and said solvent.

3. A composition according to claim 1 in which the organic solvent is N-methylpyrrolidone.

4. A composition according to claim 1 in which the polyamine is a di-primary diamine possessing from 2 to 30 carbon atoms.

5. A composition according to claim 1 in which the polyamine is an amine possessing less than 50 carbon atoms and 3 to 5 $-NH_2$ groups per molecule.

6. A composition according to claim 5 in which the polyamine in an oligomer of average formula:

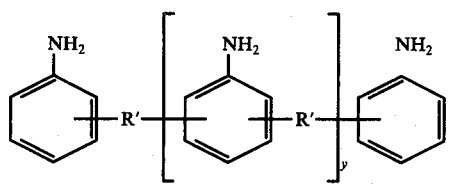

in which $y$ represents a number from 0.1 to 2 and R' represents a divalent hydrocarbon radical having from 1 to 8 carbon atoms and derived from an aldehyde or ketone of general formula:

$$O=R'$$

in which the oxygen atom is bonded to a carbon atom of the radical R'.

7. A composition according to claim 1 in which the prepolymer represents from 5% to 50% by weight of the composition.

8. A composition according to claim 1 in which the prepolymer has a softening point between 50° and 200° C.

9. A composition according to claim 1 in which the polyamine is 4,4'-diamino-diphenylmethane or a polyamine is defined in claim 5 in which R represents —CH$_2$—.

10. A composition according to claim 1 in which A represents a diphenylmethylene group.

11. A composition according to claim 1 in which D represents a —CH=CH— radical.

12. A process for preparing a composition as defined in claim 1 which comprises dispersing the said prepolymer having a particle size less than 100 microns in water, optionally containing a polar water-miscible organic solvent having a boiling point of between 110° C. and 270° C. in an amount up to 50% by weight of the water and the said solvent.

13. A process according to claim 12 in which the prepolymer is prepared in the presence of a strong acid catalyst.

14. A process according to claim 13 in which the strong acid is maleic acid.

15. A fibrous material which is impregnated with a composition as claimed in claim 1.

16. A composition according to claim 1 in which D is derived from maleic anhydride, citraconic anhydride, itaconic anhydride, pyrocinchonic anhydride, dichloromaleic anhydride or a Diels-Alder reaction product of a said anhydride with an acyclic, alicyclic or heterocyclic diene.

* * * * *